US011510028B1

(12) United States Patent
Gao et al.

(10) Patent No.: US 11,510,028 B1
(45) Date of Patent: Nov. 22, 2022

(54) PROXIMITY DETECTION USING DEVICE-TO-DEVICE COMMUNICATION LINKS

(71) Applicant: Amazon Technologies, Inc., Seattle, WA (US)

(72) Inventors: Qinghai Gao, Sunnyvale, CA (US); Qiang Hu, Sunnyvale, CA (US); Avinash Joshi, San Jose, CA (US); Piyush Tayal, San Francisco, CA (US); QingYun Wei, San Jose, CA (US); Xiaofu Ma, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 17/350,839

(22) Filed: Jun. 17, 2021

Related U.S. Application Data

(63) Continuation of application No. 16/943,172, filed on Jul. 30, 2020, now Pat. No. 11,070,945.

(51) Int. Cl.
*H04W 4/02* (2018.01)
*H04W 76/15* (2018.01)
*H04W 84/12* (2009.01)

(52) U.S. Cl.
CPC ........... *H04W 4/023* (2013.01); *H04W 76/15* (2018.02); *H04W 84/12* (2013.01)

(58) Field of Classification Search
CPC ...... H04W 4/023; H04W 76/15; H04W 84/12
USPC ........................................................ 455/456
See application file for complete search history.

(56) References Cited

U.S. PATENT DOCUMENTS

| | | | |
|---|---|---|---|
| 2017/0005713 A1 | 1/2017 | Bejarano et al. | |
| 2018/0192426 A1* | 7/2018 | Ryoo | H04W 74/0833 |
| 2019/0175074 A1 | 6/2019 | Zhang et al. | |

\* cited by examiner

*Primary Examiner* — Ted M Wang
(74) *Attorney, Agent, or Firm* — Lee & Hayes, P.C.

(57) ABSTRACT

Techniques for performing high-precision presence detection by establishing and monitoring peer-to-peer communication links between user devices residing in a same physical environment. A user device that resides in the environment may establish communication links with multiple other user devices residing in the environment. The user device may monitor the channel properties for those communication links to detect fluctuations in the channel properties caused by a user moving through a signal of the communication links. In examples where the user device detects fluctuations in channel properties for multiple communication links, the user device may determine that the user had moved though signals of the communication links. The user device may determine that, because the user moved through signals of multiple communication links, the user may be in close proximity to the user device, such as in the same room. Thus, the user device monitors multiple communication links to perform presence-detection techniques.

20 Claims, 11 Drawing Sheets

US 11,510,028 B1

PROXIMITY DETECTION USING DEVICE-TO-DEVICE COMMUNICATION LINKS

RELATED APPLICATIONS

This application claims priority to and is a continuation of U.S. patent application Ser. No. 16/943,172, filed on Jul. 30, 2020, the entire contents of which are incorporated herein by reference.

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-sensing systems can utilize many different technologies to detect the presence and/or motion of a user in an environment, such as acoustic sensing, passive infrared (PIR) sensing, ultrasonic signal sensing, radio-wave sensing, etc. To perform many of these types of presence sensing techniques, presence-sensing devices are often equipped with specialized hardware, such as specialized sensors, specialized processors, etc. However, the different types of specialized hardware required by presence-sensing devices to detect presence or motion can be disadvantageous for many reasons, such as the high cost to include in devices, consumption of large amounts of power, emitting large amounts of heat, etc. Additionally, beyond being able to detect motion, many of these presence-sensing technologies are unable to provide more context around the motion they are detecting.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
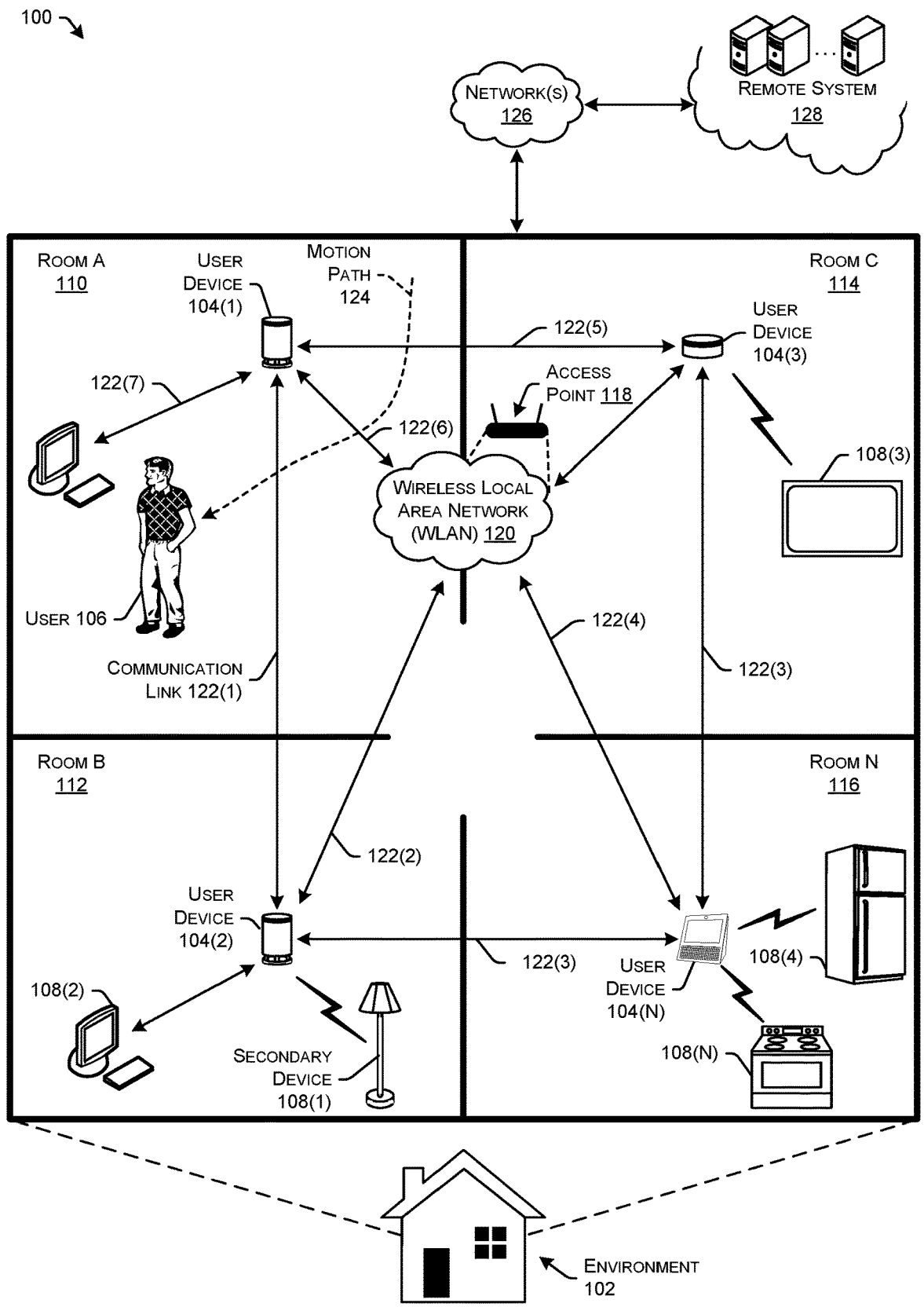
FIG. 1 illustrates a schematic diagram of an illustrative environment in which a user device establishes multiple communication links with other user devices in a same environment. The user device is able to determine that a user is within a threshold proximity (e.g., in the same room) to the user device based on detecting the user move through radio frequency (RF) signals of the multiple of the communication links.

This disclosure describes, in part, techniques for performing high-precision presence detection by establishing and monitoring peer-to-peer communication links between user devices residing in a same physical environment. For example, a user device that resides in a particular environment, such as a house, may establish communication links over RF signals with multiple other user devices residing in the house. The user device may monitor the channel properties for those communication links to detect fluctuations in the channel properties caused by a user moving through portions of the RF signals of the communication links (e.g., a path of an RF signal). In examples where the user device detects fluctuations in channel properties for multiple of the communication links, the user device may determine that the user has walked through at least a portion of RF signals of the multiple communication links of the user device. The user device may determine that, because the user was able to walk near and/or through a RF signals of the multiple communication links of the user device, the user may be within close proximity to the user device, such as being located in the same room as the user device. In this way, the user device is able to utilize multiple communication links to achieve higher-precision when performing presence-detection techniques.

In some instances, users may desire to implement presence-sensing technologies in their dwellings or other physical locations. For instance, users may desire to implement security systems that detect locations of malicious intruders, automatic lights that turn on when the user enters a room, music-streaming applications that transition the output of music from room to room as the user moves through a house, etc. Accordingly, users may opt-in or sign-up for presence-detection systems to provide various services the user would like to utilize. As noted above, different types of presence-detection systems exist that use various technologies, such as acoustic sensing, passive infrared (PIR) sensing, ultrasonic signal sensing, radio-wave sensing, etc. However, to perform many of these types of presence sensing techniques, the presence-sensing devices are equipped with specialized hardware, such as specialized sensors, specialized processors, etc., that can be disadvantageous for many reasons, such as the high cost to include in devices, consumption of large amounts of power, emitting large amounts of heat, etc. Accordingly, it may be advantageous to perform presence-detection techniques utilizing hardware that is commonly found in many user devices and that consume low amounts of power and/or processing resources.

As user devices continue to become more sophisticated, the number of user devices with network capabilities in a house continues to increase. To provide various functionalities to users, user devices often connect to an access point in the house that creates a wireless local area network (WLAN), such as a Wi-Fi network created using a protocol defined in the IEEE 802.11 standard. Thus, user devices residing in different rooms of the house generally establish communication links to the Wi-Fi network created by the access point. The user devices are able to collect channel state information (CSI) data for these communication links that indicates known channel properties of the communication links. Generally, the CSI data describes how the RF signal used for the communication link propagates from the transmitting device to the receiving device. The CSI data represents the combined effect of, for instance, scattering, fading, and power decay of the signal over the transmission distance.

In some examples, the RF signals over which the communication links are established may experience multipath propagation such that the RF signals are transmitted between devices using two or more paths due to reflections, diffraction, and scattering caused by objects in the environment of the devices. So, presence of a moving object may cause perturbations in CSI vectors of these RF signals or waves, which can be used to detect presence of an object moving in the environment of the devices. Generally, devices that use Wi-Fi that operate in IEEE 802.11a/g/n/ac use Orthogonal Frequency Division Multiplexing (OFDM) as a modulation scheme with multiple sub-carriers in a Wi-Fi channel to send data. The receiving device may measure a discrete Channel Frequency Response (CFR) in time and frequency as phase and amplitude in the form of CSI data.

Under normal operating conditions, the CSI data representing the properties of the RF signals of the communication links may remain relatively stable. However, when an object, such as a user, moves through a portion of an RF signal of a communication link established between the user device and the access point, the signal of the communication link may experience absorption, refraction, reflection, etc., as it collides with and/or passes through an object, such as the body of the user. The CSI data representing the properties of the communication link may vary when the user walks through the RF signal of the communication link. Thus, a user device is able to monitor CSI data representing properties of RF signals of communication links to determine when users (or other objects) move in proximity to the user devices.

User devices in houses may monitor the CSI data representing properties of Rf signals of their respective Wi-Fi communication links with the access point to identify fluctuations caused by a user moving through at least portions of the RF signals of their respective Wi-Fi communication links (e.g., through one path of the RF signal, through multiple paths of the RF signal, etc.). However, user devices are often located large distances from the access points, and may be in different rooms than the access points. Thus, a user device may be able to determine that the user is located somewhere in the house in proximity to the RF signal of the communication link between the user device and the access point, but may be unable to determine how close the user is to the user device versus the access point. That is, the user device may be unable to determine whether the user is in close proximity to the access point, close proximity to the user device, or somewhere in the middle. Accordingly, for purposes of presence detection, monitoring CSI data representing RF signal properties of a Wi-Fi communication link between a user device and an access point may be insufficient for precise presence-detection techniques.

The techniques described herein include user devices establishing Wi-Fi communication links with other user devices in environments to create a "mesh" of Wi-Fi communication links that enable higher-precision presence detection. The user devices may not only establish a communication link with the access point, but may also establish device-to-device communication links with other user devices in the house. Rather than requiring specialized hardware or software, the user devices may simply utilize built-in Wi-Fi radio(s) to establish communication links with the other user devices using, for example, a Wi-Fi peer-to-peer (P2P) protocol, also referred to as Wi-Fi Direct. In this way, the user devices may all establish multiple Wi-Fi communication links to create a mesh of Wi-Fi communication links in the house (or any environment).

The user devices may each be configured to establish Wi-Fi communication links directly with other Wi-Fi-enabled user devices in a house, and monitor the RF signals for those Wi-Fi communication links to detect motion. That is, the user devices may collect CSI data for each of their communication links and detect fluctuations in the CSI data that are indicative of motion through the RF signals of the communication links. In some instances, a user device may determine that CSI data for multiple communication links (e.g., two or more) is indicative of motion through portions of the RF signals of each of the communication links, and determine that the user is moving in close proximity to the user device. The user device can generate a confidence value indicating a likelihood that a user is within a threshold proximity to the user device (such as in a same room). Generally, the higher the number of communication links of a user device that indicate motion, the user device is able to determine a higher the confidence value indicating the likelihood that the user is within the same room as, and/or within a threshold proximity to, the user device. Stated simply, if a user device monitors CSI data and determines that multiple of its communication links indicate motion through portions of the RF signals of those communication links, the user device is able to determine with high confidence that the user is moving around near the user device, such as in the same room as the user device. In some instances, the user devices may be able to unilaterally determine that a user is within a threshold proximity, and take various actions based on determining that the user is in the same room (e.g., turn on lights in the room, open machine-operated blinds in the room, etc.).

However, the techniques of this application further include designating a user device in the house as a primary device, or a "coordinating" device, that coordinates the presence-detection techniques described herein. For instance, each user device may be configured to periodically send communication link data to the coordinating device. The communication link data may generally comprise any data that indicates whether or not motion has been detected for one or more communication links of the sending user device. In some instances, the user devices may analyze the CSI data for each communication link and send indications of whether or not motion has been detected for each communication link. In other examples, the user devices may simply relay the raw CSI data for each communication link and the coordinating device may analyze the CSI data.

Thus, the coordinating device may have knowledge of which user devices are detecting motion via their respective communication link(s). The coordinating device may determine which user devices have established communication links with each other, and determine a mesh of communication links. The coordinating device may then receive the communication link data from each of the user devices and make an overall decision as to which user device the user is in closest proximity based on all of the communication link data. For instance, a first user device and a second user device may each detect motion through an RF signal of a communication link established between them. However, the coordinating device may further determine that the first user device detected motion through RF signals of one or more additional communication links. In such an example, the coordinating device may determine, with high confidence, that the user is in closer proximity to the first user device than the second device.

Generally, the coordinating device may report to one or more downstream services an indication of which user device a user is closest. That is, various downstream services may subscribe for the indications of presence detection, such as an automated light system, a security system, etc. The coordinating device may provide these downstream services with indications of where a user's presence was detected. However, in instances where the coordinating device is not utilized, the user devices themselves may report when the user device has detected, with a confidence value over a threshold confidence value (e.g., 85% confident, 95% confident, etc.), that a user is within a threshold proximity to the user device.

In some examples, the presence-detection techniques described herein may be further implemented in different use cases. For instance, the user devices may be configured to perform automated-provisioning techniques for new devices introduced into the environment. Traditionally, when a user introduces a new user device into their house, there is an out-of-box-experience (OOBE) process the user must go through to provision the new user device for use. This OOBE process may include registering the user device with a service, connecting the user device to the Wi-Fi network provided by the access point, etc. This process can often be time-consuming and/or frustrating, and the other user devices in the house may be configured to perform automated provisioning of the new user device on behalf of the user. The presence-detection techniques described herein may be utilized as part of this automated-provisioning process.

For instance, a new user device (e.g., "provisionee device") may be introduced into a respective environment to be provisioned by existing user devices in the respective environment (e.g., "provisioner devices"). In order to automate the provisioning of a provisionee device, the provisionee device may be configured to, upon power up, emit an advertisement (e.g., Bluetooth Low Energy (BLE) packet, Wi-Fi packet, etc.) into the environment for the provisioner devices to detect. Thus, the provisioner devices need to keep one or more radios active to detect this advertisement message. Maintaining radio(s) in an active state at all times may consume a significant amount of power of the provisioner device, which is disadvantageous. However, because the provisionee device is configured to emit the advertisement message upon being powered up, a user generally must be present to turn on the provisionee device. Thus, the provisioner devices may only need to power on their radio(s) when a user is present in order to detect an advertisement message.

Utilizing the presence-detection techniques described herein, the provisioner devices may be configured to remain in a low-power mode where the provisioner devices monitor the CSI data for only their respective a communication link with the access point in the house. When the provisioner devices determine that the CSI data for the communication link indicates motion through the underlying RF signal, the provisioner device may enter into a higher-power mode (e.g., normal operating) and activate a radio to detect the advertisement message (e.g., activate a Bluetooth radio). Thus, the provisioner devices may detect motion of a user in the respective environment, and enter into an operating mode where the provisioner devices are capable of detecting the advertisement from the provisionee device. After detecting the advertisement from the provisionee device, the provisioner device that detected the advertisement may undergo the automated-provisioning process to provision the provisionee device that was introduced into the environment of the provisioner devices.

Although the techniques described herein are with reference to determining the position of a user in a house, the techniques are generally applicable to detecting any moving object in any environment in which devices can establishing multiple communication links and/or RF signals, such as Wi-Fi communication links established using protocol defined by an IEEE 802.11 standard. Further, the techniques are described with respect to Wi-Fi communication links, but the techniques may be used for other types of communication protocols or standards as well that are usable to establish communication links over RF signals.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which a user device 104(1) establishes multiple communication links with other user devices 104(2)-104(N) in the environment 102. The user device 104(1) is able to determine that a user 106 is within a threshold proximity (e.g., in the same room) to the user device 104(1) based on detecting the user 106 move through RF signals of multiple of the communication links.

Generally, the environment 102 may comprise any type of physical environment in which multiple user devices 104 may reside, such as a house, apartment, office building, warehouse, and/or any other structure or building. The user devices 104 may comprise any type of computing device that includes one or more network interfaces usable to communicate using one or more communication protocols. For instance, the user devices 104 may be voice-controlled assistants, tablet computing devices, smart televisions (TVs), laptop computers, desktop computers, mobile phones, display devices, audio devices, gaming devices, and/or the like. In some examples, the user devices 104 may be communicatively coupled to one or more secondary devices 108 using various communication protocols, such as ZigBee, Bluetooth, LoRa, and the like. In some instances, the secondary devices 108 may not be able to communicate using various protocols, such as Wi-Fi, and be controlled by a user device 104. For instance, the secondary devices 108 may be lights, appliances (e.g., stove, refrigerator, TVs), doorbell devices, etc. Accordingly, the user devices 104 may be configured to control the secondary devices 108 by sending commands over a usable communication protocol, such as Bluetooth, ZigBee, or the like. In other examples, the secondary devices 108 may also be a Wi-Fi-enabled devices and include a W-Fi chipset as well (e.g., Wi-Fi-enabled light bulbs). Thus, the user devices 104 may also establish Wi-Fi communication links with the secondary devices 108 and collect CSI data on those communication links as well to detect motion in proximity to those communication links. As described herein, the communication links 122 may be established over signals, such as RF signals.

As illustrated, the environment 102 (e.g., house) may include multiple rooms, such as room A 110, room B 112, Room C 114, and Room N 116 (where "N" is any integer of 2 or greater). As shown, a user device 104 may be located in each of the four rooms. The user devices 104 may each establish a respective communication link 122 with an access point device 118 (e.g., router, switch, hub, etc.) that creates a wireless local area network (WLAN) 120 using a communication protocol, such as Wi-Fi defined by IEEE 802.11. As described herein, establishing a communication link 122 between devices may include performing a handshake as defined by the governing protocol, such as an IEEE 802.11 protocol.

However, in addition to establishing respective communication links with the access point 118, each user device 104 may establish communication links 122 directly with other user devices 104 in the environment 102. For instance, the user devices 104 may each be configured to detect (e.g., advertisements) other Wi-Fi enabled devices in the environment 102, and utilize a peer-to-peer (P2P) protocol such as Wi-Fi Direct, to establish communication links 122 directly between the user devices 104. In this way, each user device 104 may establish at least two communication links 122 with other devices in the environment 102.

Thus, the user devices 104 may establish Wi-Fi communication links 122 with other user devices in the environment 102 to create a "mesh" of Wi-Fi communication links 122 that enable higher-precision presence detection. The user devices 104 may not only establish a communication link 122 with the access point 118, but may also establish device-to-device communication links with other user devices 104 in the environment 102 to create a mesh of Wi-Fi communication links 122 in the environment 122.

The user devices 104 may monitor those Wi-Fi communication links 122 to detect motion. For instance, the user devices 104 may (continuously, periodically, etc.) collect CSI data for each of their communication links 122 and determine whether the CSI data includes fluctuations that are indicative of movement through portions of RF signals (e.g., one or more signal paths) of the communication links 122. In some instances, a user device 104(1) may determine that CSI data for multiple communication links 122(1), 122(5), and 122(6), (e.g., two or more) is indicative of motion through RF signals of the communication links 122, and determine that the user 106 is moving in close proximity to the user device 104(1). The user device 104(1) can generate a confidence value indicating a likelihood that the user 106 is within a threshold proximity to the user device 104(1), such as in a same room A 110. Generally, the higher the number of communication links 122 of the user device 104(1) that indicate motion, the user device 104(1) is able to determine a higher the confidence value indicating the likelihood that the user 106 is within the same room as, and/or within a threshold proximity to, the user device 104(1). Stated simply, because the user device 104(1) monitors CSI data and determines that multiple of its communication links 122 indicate motion through their underlying signals, the user device 104(1) is able to determine with high confidence that the user 106 is moving around near the user device 104(1) in the room A 110.

In some instances, the user device 104(1) may determine that the user 106 is in the same room A 110 (or otherwise in close proximity) as the user device 104(1) despite CSI data for a communication link 122(7) not indicating motion. Thus, in some instances, if CSI data for enough communication links 122 indicate motion, then even if CSI data for a communication link 122(7) does not indicate motion, the user device 104(1) may still be confident enough to determine that the user 106 is within the same room A 110 (or otherwise within a threshold proximity to the user device 104(1)).

In some instances, the user devices 104 may be able to unilaterally determine that the user 106 is within a threshold proximity, and take various actions based on determining that the user is in the same room (e.g., turn on lights in the room, open machine-operated blinds in the room, etc.).

In some examples the user devices 104 may have access to one or more networks 126 through the access point 118. The one or more networks 126 may include any viable communication technology, such as wired and/or wireless modalities and/or technologies. Networks 126 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

The user devices 104 may access the remote system 128 over the network(s) 126. In some examples, the remote systems 128 may support the user devices 104 and/or be downstream services that enlist for use of the presence-detection techniques described herein.

The remote system 128 may determine the location of the user 106 based on the user devices 104 presence-detection techniques, formulate commands for the user devices 104 to perform, determine which of the user devices 104 is to perform an action responsive to the user 106 being in a particular location (e.g., turning on lights, turning on security systems, turning on music, etc.). The remote system 128 may be implemented as one or more computing devices including one or more servers, desktop computers, laptop computers, or the like. In one example, the remote system 128 is configured in a server cluster, server farm, data center, mainframe, cloud computing environment, or a combination thereof. To illustrate, the remote system 128 may include any number of devices that operate as a distributed computing resource (e.g., cloud computing, hosted computing, etc.) that provides services, such as storage, computing, networking, and so on.

In various examples, the remote system 128 may include one or more processors to power components, devices, and actions of the remote system 128, and one or more network interfaces such as a wireless or Wi-Fi network communications interface, an Ethernet communications interface, a cellular network communications interface, a Bluetooth communications interface, etc., for communications by the remote system 128 over various types of networks 126, including wide-area network, local-area networks, private networks, public networks etc. In the case of a wireless communications interfaces, such interfaces may include radio transceivers and associated control circuits and logic for implementing appropriate communication protocols. The remote system 128 may further include computer-readable media which stores various components, components, or other executable software to perform various arbitration actions to determine which user device 104 is to perform to a command based on the location of the user 106.

Figure 2A:
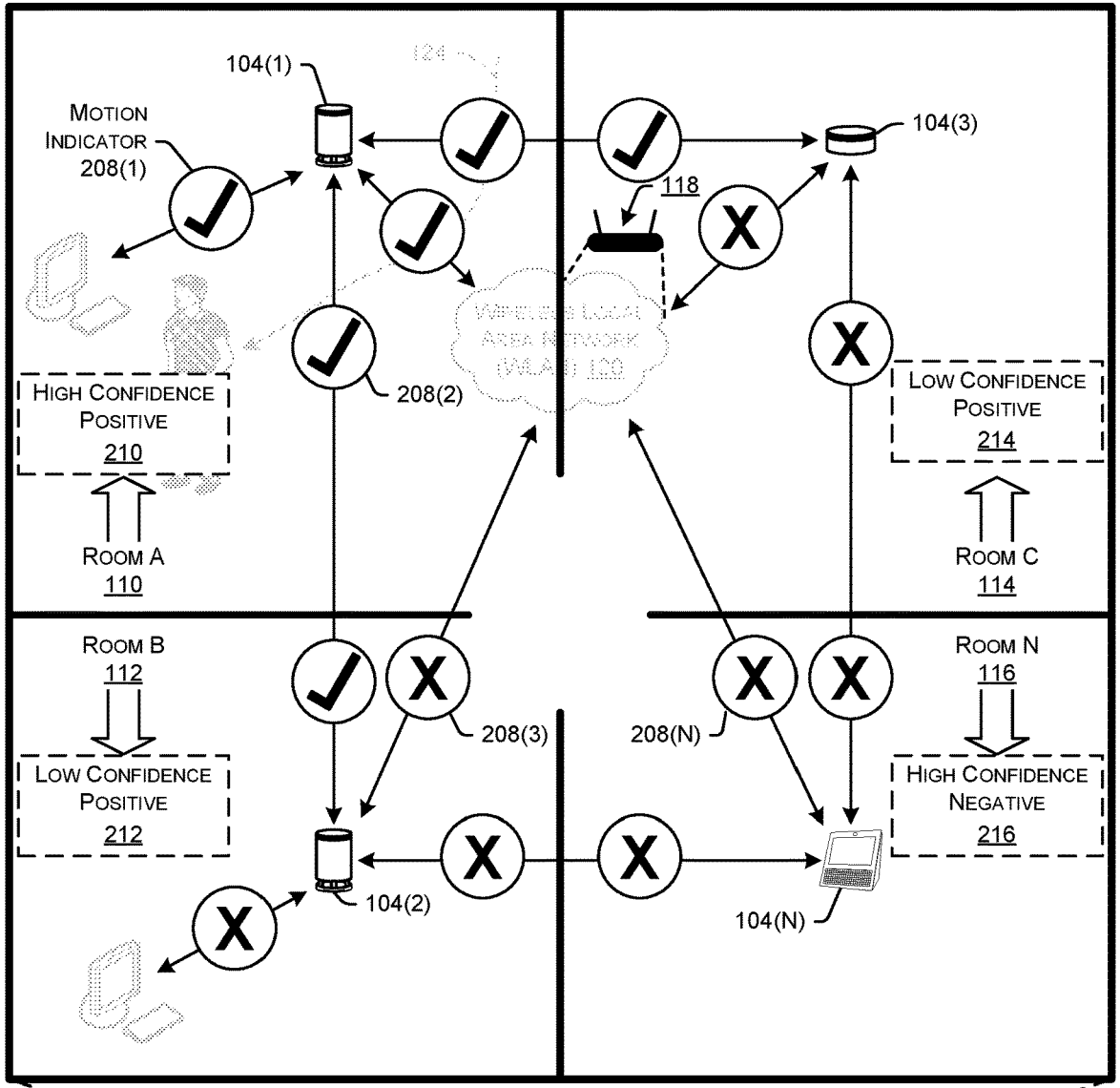
FIGS. 2A and 2B illustrate schematic diagrams of illustrative environments in which user devices establish multiple communication links with other user devices in a same physical environment. The user devices then monitor channel state information (CSI) data for the communication links to determine whether a user moved through RF signals for their respective communication links. Further, the user devices may communicate respective communication link data to a coordinating device in the environment that makes an overall decision as to which of the user devices the user is in closest proximity.
Figure 2B:
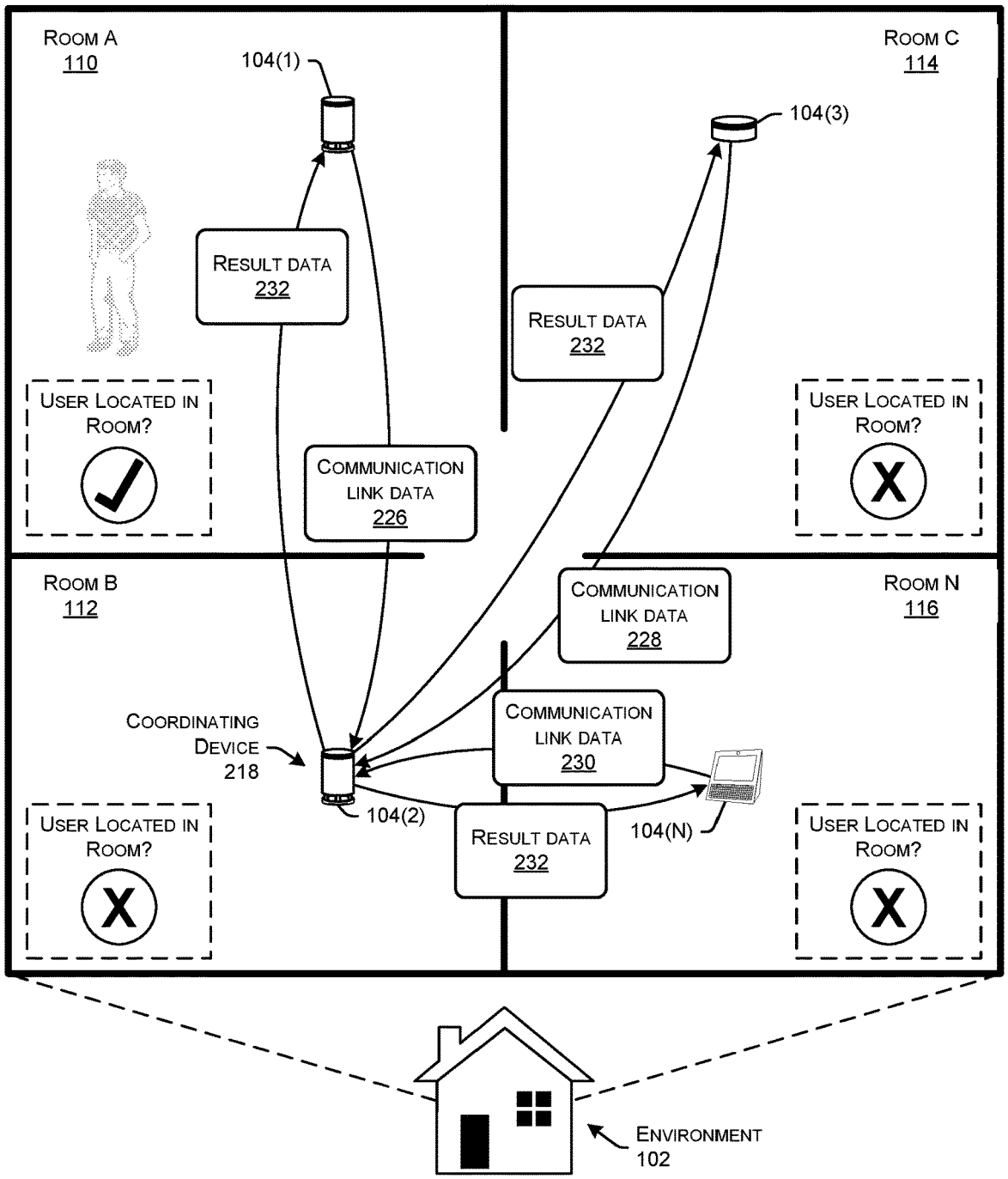

FIGS. 2A and 2B illustrate schematic diagrams 200 of illustrative environments 102 in which user devices 104 establish multiple communication links 122 with other user devices 104 in the same physical environment 102. The user devices 104 then monitor CSI data for the communication links 122 to determine whether the user 106 moved through RF signals of their respective communication links 122. Further, the user devices 104 may communicate respective communication link data to a coordinating device 218 in the environment 102 that makes an overall decision as to which of the user devices 104 the user 106 is in closest proximity.

At 202 in FIG. 2A, each of the user devices 104 may establish communication links 122 with other devices using an IEEE 802.011 protocol. For instance, the user devices 104 may utilize Wi-Fi Direct to connect to peer user devices 104. At 204, the user devices 104 may each collect CSI data for the communication links 122. For instance, the user devices 104 periodically or continuously sample CSI data for the communication links 122.

At 206, the user devices 104 may determine whether each communication link 122 indicates motion through a respective RF signal. In some instances, the user devices 104 may establish a baseline of what CSI data represents in situations where an object is not moving through the RF signals of the respective communication links 122. The user devices 104 may then determine if fluctuations in the CSI data are greater than or equal to a threshold variance from the baseline (e.g., greater than 10% variance, greater than 25% variance, etc.). As illustrated in FIG. 2A, the user devices 104 have determined that the user 106 passed through RF signals of communication links 122 marked with an icon 208 of a checkmark, but not through RF signals of communication links 122 marked with an icon 208 of an X.

As illustrated, the user 106 (or other object) need not necessarily walk through the line-of-sight (LoS) path of a communication link 122 for that communication link 122 to experience fluctuations in CSI data. Thus, if the user 106 walks within a threshold proximity to a LoS of the communication link 122 (e.g., within 10 feet, within 5 feet, etc.), the CSI data for that communication link 122 may fluctuate to indicate motion of an object through one of the signal paths of the RF signal. In the illustrated example, the motion path 124 of the user 106 does not pass through the LoS of the communication link 122(7). However, the communication link 122(7) may still have a motion indicator 208(1) of a check mark, indicating that the CSI data for the link still experienced fluctuations caused by the user 106 moving through at least one signal path of an RF signal of the communication link 122(7).

Generally, the CSI data for the communication links 122 may comprise a complex number having an amplitude and phase value for each sample collected over time. The CSI data may be collected over a period of time (e.g., one second, ten seconds, one minute, etc.) The magnitude or amplitude portion of the CSI data generally indicates a strength of the signal for the communication links 122, and the phase generally represents propagation characteristics of the signal, such as propagation delay or propagation paths. Generally, the wireless signals of the communication links 122 have a multi-path effect where the signals take multiple paths through the environment and between the devices that established the communication links 122. Thus, even is a user 106 (or other object) does not move directly in the LoS path of a communication link 122, the movement of the user 106 may still be represented as fluctuations in the CSI data because the user 106 interferes with paths of the signal propagating through the environment. Thus, as long as a user 106 is moving through a path of an RF signal of a communication link 122 (e.g., in the same room, within 5 feet, within 10 feet, etc.), the CSI data for that communication link 122 may fluctuate due to the movement of the user 106.

The materials of the object that is in motion may cause different fluctuations in the CSI data. For instance, a user 106 is primarily made out of water, and the signals of the communication links 122 may have reduced amplitude due to the user 106 absorbing the some of the signals, thereby reducing the strength of the signals. When a user 106 is moving, there may be fluctuations in the magnitude/amplitude as well as the phase for the CSI data samples. Because the signals traverse different paths or lengths, those translate into different phases and movement of a user 106 through those different paths may cause fluctuations in the phase values for the CSI data.

Thus, fluctuations in CSI data, which may be positive fluctuations, or negative fluctuations, generally indicate movement of an object through paths of RF signals of the communication links 122. In some instances, the user devices 104 may determine whether the values in the CSI data fluctuate by more than a threshold amount that indicates, with a high level of confidence, that an object is moving through an RF signal of the communication link 122.

In some instances, the user devices 104 may further determine confidence values indicating how likely it is that the user 106 is in close proximity to the user devices 104. As illustrated, the user device 104(1) may have a high confidence positive 210 that the user 106 is in close proximity to the user device 104(1) as three of the user device's 104(1) communication links detected motion. Further, user devices 104(2) and 104(2) has low confidence positives 212 and 214 because only one communication link 122 out of the communication links 122 for those devices 104(2) and 104(3) had CSI data indicating motion. Finally, the user device 104(N) may determine that the CSI data for its respective communication links 122 do not indicate motion at all, and thus has a high confidence negative 216 as the user device 104 is very confident the user 106 is not in the room N 116 of the user device 104(N).

FIG. 2B illustrates techniques performed by a coordinating device to make a final decision as to which room the user 106 is located, and causing a command to be performed based on determining which room the user 106 is located. At 220, the user devices 104 may send communication link data 226 to the coordinating device 218. In some instances, the communication link data 226 may comprise the overall confidence values that the user devices 104 computed that indicate a likelihood that the user 106 is in the respective rooms of the user devices 104. In other examples, the communication link data 226 may comprise the raw CSI data collected by the user devices 104 for the communication links 122.

At 222, the coordinating device 218 may identify the room with motion caused by the user 106. For instance, the coordinating device 218 may analyze the communication link data 226 from each of the user devices 104 and determine which user devices 104 had a higher confidence value that the user device 104 was located in the respective room. In some instances, the coordinating device 218 may analyze the raw CSI data and make a determination as to which room the user 106 is in based on determining which of the Rf signals of the communication links 122 the user 106 walked through.

At 224, the coordinating device 218 may send result data 232 to the user device 104(1) in the room A 110 where the user 106 moved through the RF signals of the communication links 122. The result data 232 may generally represent a command for the user device 104(1) to perform, which may include a command for the user device 104(1) to control a secondary device (e.g., turn on a light, turn on a speaker, etc.). Additionally, the coordinating device 218 may further send back result data 232 to the user devices 104 in the other rooms in which motion was not detected. The user devices 104 in those rooms may additionally take actions based on not detecting movement of an object in those rooms, such as turning off a light, turning off music, updating a status of the room as empty, and so forth.

Figure 3:
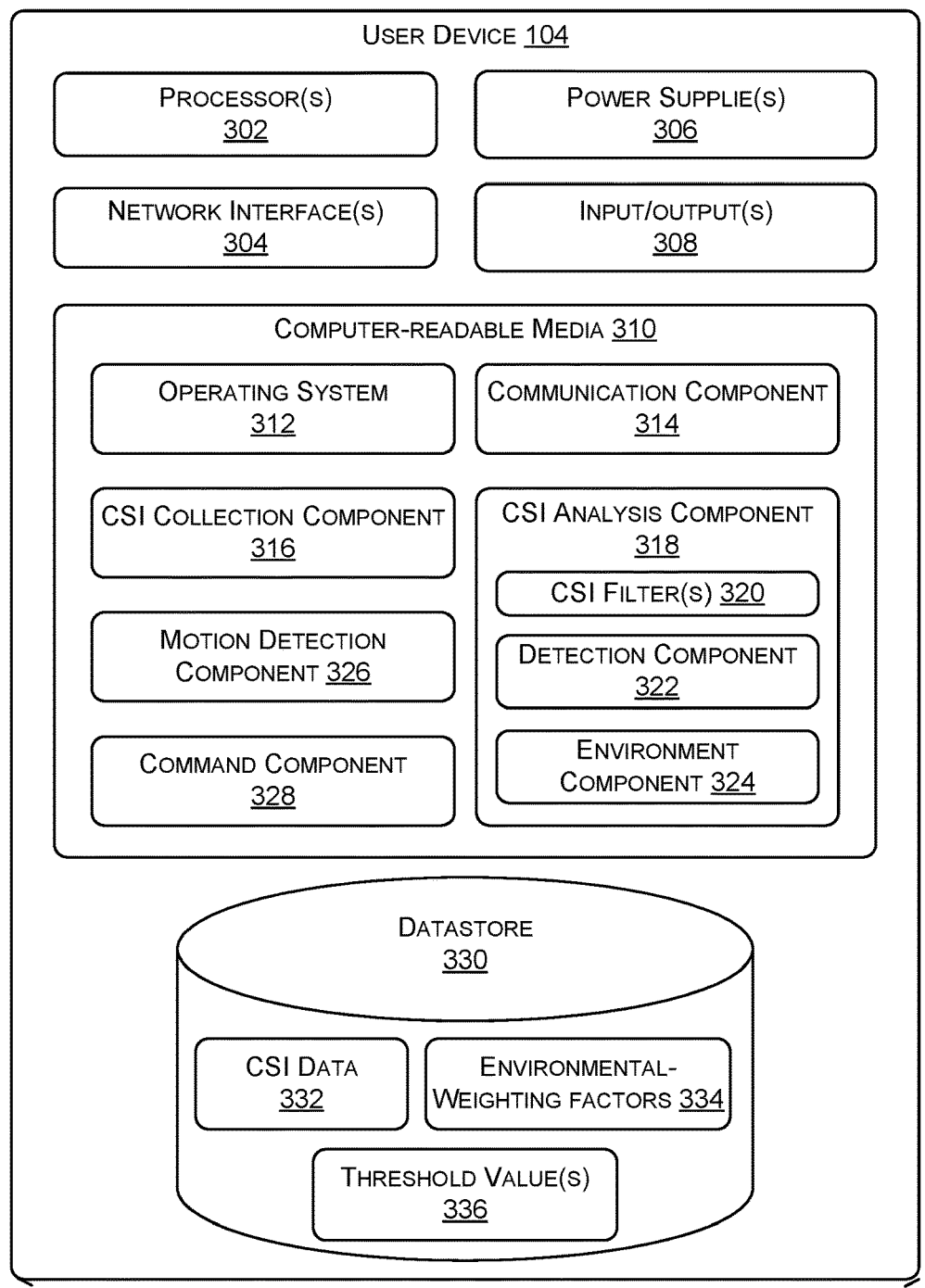
FIG. 3 illustrates a block diagram of an example architecture of a user device that establishes multiple communication links with devices in an environment, and determines whether a user moves through RF signals of the communication links to perform presence-detection techniques.

FIG. 3 illustrates a block diagram of an example architecture 300 of a user device 104 that establishes multiple communication links 122 with devices in an environment, and determines whether a user 106 moves through RF signals of the communication links 122 to perform presence-detection techniques.

The user device 104 includes one or more processors 300 which may include a central processing unit (CPU), a graphics processing unit (GPU), a microprocessor, a digital signal processor, and so on. Additionally, the user device 104 may include one or more network interfaces 304 comprising one or more respective radios. For instance, each of the net network interface(s) 304 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 304 may include a wide area network (WAN) component to enable communication over a wide area network. Thus, the network interfaces(s) 304 may include a wireless or Wi-Fi network communications interface, an Ethernet communications interface, a cellular network communications interface, a Bluetooth communications interface, etc., for communications with multiple devices over various types of networks and protocols, including wide-area network, local-area networks, private networks, public networks etc. In the case of a wireless communications interfaces, such interfaces may include radio transceivers and associated control circuits and logic for implementing appropriate communication protocols.

The user device 104 may further include one or more power supplies 306, such as an internal battery supply and/or connection to mains power. Additionally, the user device 104 may include one or more input/output devices 308, such as a mouse, keyboard, one or more displays (e.g., touch screen, Liquid-crystal Display (LCD), Light-emitting Diode (LED) display, organic LED display, plasma display, electronic paper display, etc.), one or more speakers, one or more microphones, one or more sensors (e.g., accelerometer, magnetometer, etc.), one or more lights, and so on. Any number of components of the voice-enabled device 108 may be used to receive input from a user and/or to output a response.

The user device 104 may include computer-readable media 310. The computer-readable media 310 may be used to store any number of software components that are executable by the processors 302. Software components stored in the computer-readable media 310 may include an operating system 312 that is configured to manage hardware and services within and coupled to the user device 104. In addition, executable components stored by the computer-readable media 310 may include a communication component 314 that causes the user device 104 to perform techniques for communicating with other devices using various communication protocols. The communication component 314 may include various communication protocol stacks and/or software instructions for communicating according to the techniques herein. For instance, the communication component 314 may perform techniques for establishing connections with various other devices described herein, such as communication links 122.

The computer-readable media 310 may further include a CSI collection component 316 configured to continuously, periodically, etc., collect CSI data for the communication links 122 of the user device 122. The CSI collection component 316 may collect CSI data using any technique known in the art. The computer-readable media 310 may further include a CSI analysis component 318 that analyzes CSI data for the communication links. The CSI analysis component 318 may include one or more CSI filters 320 configured to filter the CSI data for further processing. Additionally, the CSI analysis component 318 may further include a detection component 322 configured to determine confidence values indicating a likelihood that CSI data for a communication link 122 indicates motion of an object in an LoS for the communication link 122. Further, the CSI analysis component 318 may further include an environment component 324 that weights results based on an environment in which the user device 104 located. For instance, confidence values determined using different subcarriers may be weighted based on those subcarriers providing better, or worse, indications of movement in a particular environment. Further details of the CSI analysis component 318 is provided with respect to FIG. 4.

The computer-readable media 310 may further include a motion detection component 326 configured to determine a likelihood that a user 106 is within a threshold proximity to the user device 104 based on results from analyzing the CSI data for each communication link 122 of the user device 104. The command component 328 may be configured to determine and/or execute commands based on the user device 104 detecting that a user 106 is within a threshold proximity to the user device 104 (e.g., in the same room as the user device 104).

The user device 104 may further include a datastore 330 (e.g., disk or other long-term storage) that stores various types of data. The datastore 330 may store CSI data 332 obtained for the communication links 332. Generally, the CSI data 332 represents how wireless signals propagate from the transmitter to the receiver at certain carrier frequencies along multiple paths. For a WiFi system with MIMO-OFDM, CSI data 332 is a 3D matrix of complex values representing the amplitude attenuation and phase shift of multi-path WiFi channels. A time series of CSI measurements captures how wireless signals travel through surrounding objects and humans in time, frequency, and spatial domains, so it can be used for sensing or detecting applications. For example, CSI amplitude variations in the time domain have different patterns for different humans, activities, gestures, etc., which can be used for human presence detection. The datastore 330 may further include environmental-weighting factors 334 that are applied to confidence values regarding a likelihood of motion detected in various subcarrier groups. The weighting factors 334 may be based on how accurately a particular subcarrier grouping represents motion through an RF signal of a communication link 122 in different environments (e.g., office versus kitchen). Additionally, the datastore 330 may store one or more threshold values 336. The threshold values 336 may represent values that, if confidence values indicating a likelihood of movement are equal to or greater than the threshold values 336, then the communication link 122 indicates motion. In some instances, the user device 104 may comprise the coordinating device 218.

Figure 4:
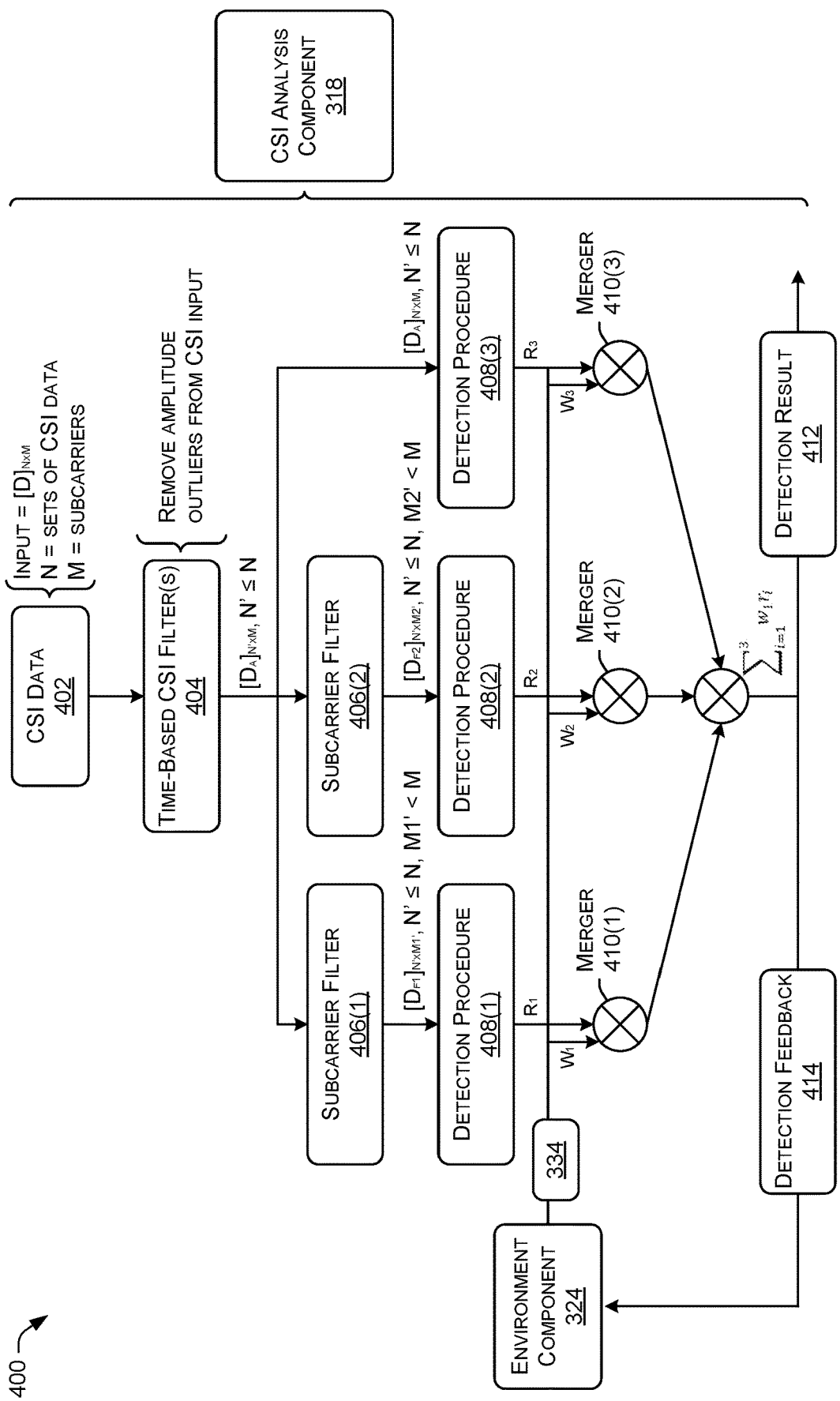
FIG. 4 illustrates a flow diagram of an example process performed by a user device for implementing a cascading filtering architecture to process CSI data for a communication link to detect motion through an RF signal of the communication link.

FIG. 4 illustrates a flow diagram of an example process 400 performed by a user device 104 for implementing a cascading filtering architecture to process CSI data 332 for a communication link to detect motion through the RF signal of the communication link 122.

The techniques may be performed by the CSI analysis component 318 as shown in FIG. 4. The CSI analysis component 318 may perform the process 400 to initially filter out "noisy" components from the raw CSI data 332 to reduce false alarms and increase the accuracy and stability of detection. The filtering process 400 is conducted on both time domain and frequency domain. The CSI analysis component 318 may first filter out the outliers from the CSI data 332 on time domain, followed by subcarrier filtering on frequency domain using different filters. The CSI analysis component 318 may input the filtered data to a same detection procedure in parallel to generate a set of detection results, which will be used to make a collective decision on the final detection result. The environmental-weighting factors 334 may comprise a set of weights used to calculate the final result, which captures the effectiveness of every filter in a particular environment 102, are generated by the environment component 324 that is trained using data collected from experiments in different environmental scenarios, such as office, apartment, single family home, townhouse, and etc. The CSI analysis component 318 also utilizes a feedback mechanism designed to do on-line calibrations to the generation of the environmental-weighting factors 334.

Generally, the CSI data 332 at different subcarriers in a MIMO-OFDM Wi-Fi system are impacted by the movement/presence of user 106 at different levels. In a specific scenario, the variance of CSI values at one subcarrier may be much higher than that at another subcarrier. This may lead to false alarm or detection if the set of variances at all subcarriers (e.g., 52) is in use. Thus, using subcarrier filters may be an efficient and straightforward way to address this issue. The CSI analysis component 318 may utilize a particular method of subcarrier filtering called ensemble filtering.

The CSI analysis component 318 may prioritize subcarriers with smaller but stable variance values when people are present or moving in the proximity of our system. The variance of CSI will be compared across different user devices 104 to determine which user device 104 is the closest to the user 106. The large variance of CSI at some subcarriers will saturate the contribution from the other subcarriers (e.g., due to the complicated propagation characteristics of Wi-Fi signals, it is hard to interpret the accurate distance between the user 106 and the detecting Wi-Fi device 104 from the observed variance of CSI at one certain subcarrier on that user device 104). Moreover, a subcarrier with very large variance tends to be sensitive, which means the variance may also be large when the user 106 is not very close to the detecting user device 104 and the variance value changes too frequently leading to unstable detection results. Additionally, the subcarriers with large CSI variance values are usually with small CSI magnitude values. In general, those subcarriers suffer from the deep fading in the frequency domain. This also explains why the CSI variance are high on those subcarriers.

Moreover, the scalar relationship on the CSI variance at different subcarriers is not persistent and may be affected by the surrounding environment setup, the body shape and clothing of user 106, the gait or gesture of user movement, and hardware of the user devices 104.

FIG. 4 illustrates an exemplary example where the CSI data 332 may include a set of instances of CSI data 332 collected. As an example, for every second, there may be 10 sets of CSI data 332 collected and plotted. However, some of the instances may be unstable due to, for instance, the hardware used in a user device 104. Thus, these instances may have a negative impact on detection and need to be filtered out of the set of instances of CSI data 332.

The CSI analysis component 318 may receive CSI data 402 as input data, which may comprise a set of instances of CSI data 332 across subcarriers (e.g., 52 subcarriers). The CSI data 402 may be input into a time-based CSI tiler 404, which may utilize unsupervised machine learning algorithms, such as K-means, hierarchical clustering algorithms. The time-based CSI filter(s) 404 may remove outliers from the set of CSI data 332 using coherence detection for amplitudes/magnitudes of the CSI data 332.

After the CSI analysis component 318 filters the set of instances of CSI data 332 via the time-based CSI filter(s) 404, the CSI analysis component 318 may further filter the filtered set of instances of CSI data 332 using one or more subcarrier filters 406. The subcarrier filters 406 may filter out groups of subcarriers according to different characteristics. For instance, subcarrier filter 406(1) may filter out a defined number of the subcarriers with the lowest magnitude (e.g., remove 10 out of the 52 to result in 42 subcarriers). As another example, subcarrier filter 406(2) may filter out subcarrier filters with normalized magnitude below than some predefined magnitude (dB) (e.g., −3 dB). In another example, another subcarrier filter 406 may filter our subcarriers according to the variance, such as by filtering out a predefined number of subcarriers with the highest variance values (e.g., 10 out of the 52 to result in 42 subcarriers).

After the sets of instances of CSI data 334 have been filtered into subsets based on subcarrier, the subcarrier subsets may be input into parallel detection procedures 408 that are configured to determine whether the CSI data 332 in the subsets represent motion through an RF signal of a communication link 122. The detection procedures 408 may output results (e.g., confidence values) indicating likelihoods that the particular subcarrier subset of the CSI data 332 represent movement through the RF signal of the communication link. The results may then be merged by mergers 410 with the environmental-weighting factors 334.

Through experiments in different typical scenarios, such as condo, townhouse, house, offices, and etc., the effectiveness of filtered data sets and non-filtered data set may be ranked for detecting motion. Each of the subcarrier groupings will be assigned a different weight in different scenarios by the environment component 324. The environment component 324 may generate the environmental-weighting factors 334 via a machine learning algorithm, which is trained according to the training data collected in the experiments.

Thus, the environmental-weighting factors 334 may be applied to the results output from the detection procedure 408 for the environment in which the user device 104 is located. As an example, if a user 106 indicates that the user device 104 was located in an office, then environmental-weighting factors 334 will be applied to the results for each subcarrier grouping such that subcarrier groupings that more accurately identify movement in an office are weighted more heavily, and subcarrier groupings that less accurately identify movement in an office are weighted less heavily. In this way, the merger 410 may combine the environmental-weighting factors 334 with the results to output a weighted result. The weighted results may then be combined and a detection result 412 may be output by the CSI analysis component 318. For instance, if the CSI analysis component 318 determines that an overall weighted sum of the result data indicates an overall confidence value that is greater than some threshold (e.g., 80%, 90%, etc.), the detection result 412 may indicate motion, and vice-versa.

Additionally, the environment component 324 also implements a feedback mechanism, so that based on the detection feedback 414 from user 106 input and detection result, the environment component 324 can calibrate the environmental-weighting factors 334 on different filtering paths to increase the accuracy of detection.

Figure 5:
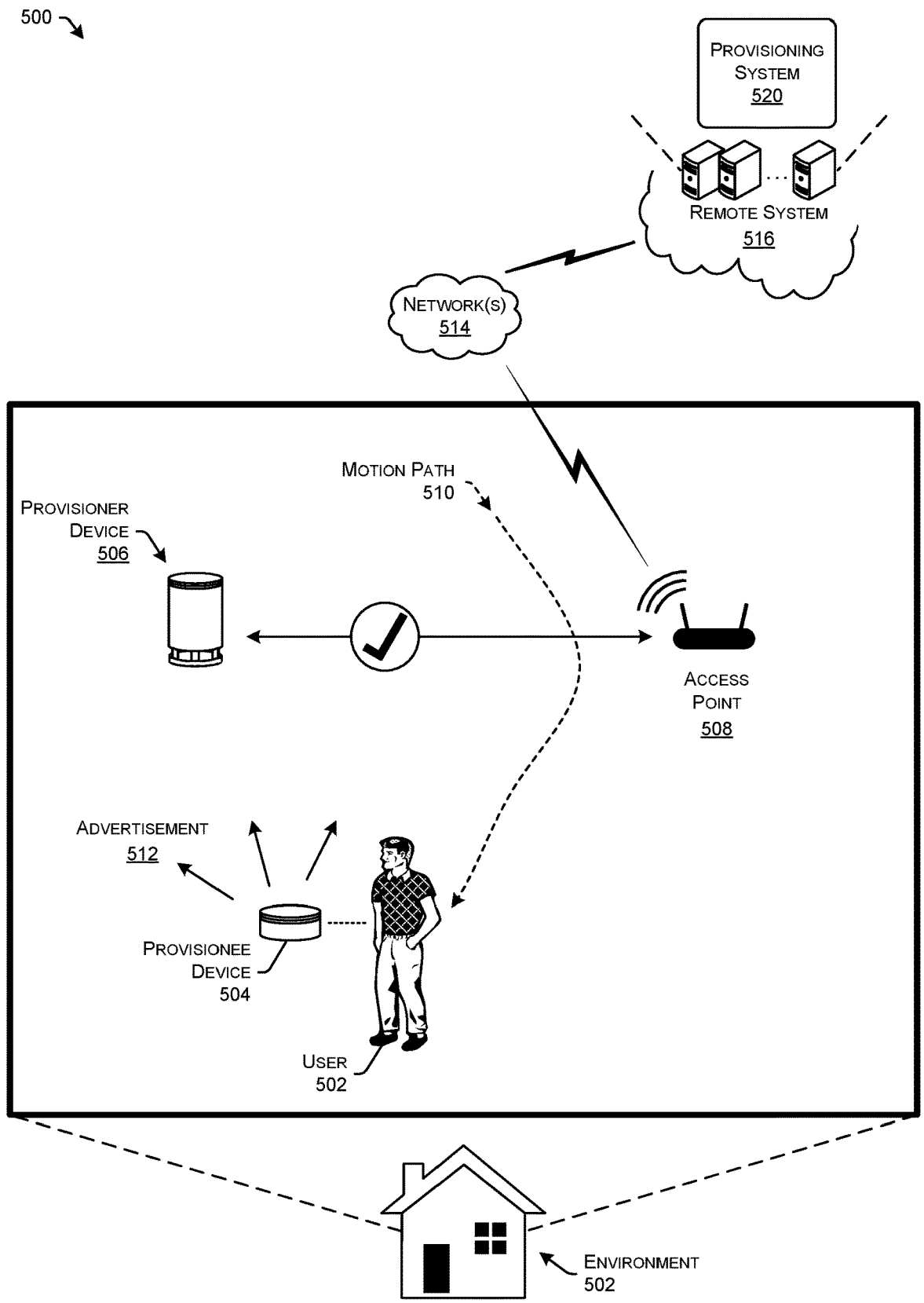
FIG. 5 illustrates a schematic diagram of an example environment in which a provisioner device monitors a communication link to an access point in a low-power mode to detect a user moving through an RF signal of the communication link. Upon detecting motion, the user device exits the low-power mode to detect an advertisement from a provisionee device in the environment.

FIG. 5 illustrates a schematic diagram 500 of an example environment 502 in which a provisioner device 506 monitors a communication link 122 to an access point 508 in a low-power mode to detect a user 106 moving through the RF signal of the communication link 122. Upon detecting motion, the provisioner device 506 exits the low-power mode to detect an advertisement from a provisionee device 504 in the environment 502. In some instances, the techniques described with reference to FIGS. 5 and 6 may be performed when a user 502 opts in, or signs up, for use of the techniques. That is, the user 502 may determine they would like to have the devices perform the techniques of FIGS. 5 and 6 prior to the devices performing the techniques.

The user 502 may introduce a new user device (e.g., provisionee device 504) into the environment 502 to be provisioned by existing user devices in the environment 502 (e.g., provisioner device 506). In order to automate the provisioning of a provisionee device 504, the provisionee device 504 may be configured to, upon power up, emit an advertisement 512 (e.g., Bluetooth Low Energy (BLE) packet, Wi-Fi packet, etc.) into the environment 502 for the provisioner device 506 to detect. Thus, the provisioner device 506 needs to keep one or more radios active to detect this advertisement message 512. However, maintaining radio(s) in an active state at all times may consume a significant amount of power of the provisioner device 506, which is disadvantageous. However, because the provisionee device 504 is configured to emit the advertisement message 512 upon being powered up, the user 106 generally must be present to turn on the provisionee device 504. Thus, the provisioner device 506 may only need to power on its radio(s) when the user 106 is present in order to detect the advertisement message 512.

Utilizing the presence-detection techniques described herein, the provisioner device 506 may be configured to remain in the low-power mode where the provisioner device 506 monitors the CSI data 332 for only its communication link 122 with the access point 508 in the environment 502. When the provisioner device 504 determines that the CSI data 332 for the communication link 122 indicate motion, the provisioner device 506 may enter into a higher-power mode (e.g., normal operating) and activate a radio to detect the advertisement message 512 (e.g., activate a Bluetooth radio). Thus, the provisioner device 506 may detect motion of the user 502 in the respective environment 502, and enter into an operating mode where the provisioner device 506 is capable of detecting the advertisement 512 from the provisionee device 504. After detecting the advertisement 512 from the provisionee device 504, the provisioner device 506 that detected the advertisement 5122 may undergo the automated-provisioning process to provision the provisionee device 504 that was introduced into the environment 502 of the provisioner device 506.

In some instances, the provisioner device 506 may communicate over one or more networks 514 via the access point 508 with a remote system 516 that hosts a provisioning system 520. The provisioner device 506 may perform various operations for establishing trust for the provisionee device 504 (e.g., obtaining credentials), and also register the provisionee device 504 with the provisioning system 520. The provisioner device 506 may provide credentials to the provisionee device 504, and/or perform other operations for registering the provisionee device 504 with the provisioning system 520.

FIGS. 6, 7, 8, 9, and 10 illustrate flow diagrams of example methods 600, 700, 800, 900, and 1000 for performing presence-detection techniques using multiple communication links 122 as described herein. These methods are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In some examples, the techniques of methods/processes 600, 700, 800, 900, and 1000 may be performed by the user device 104. The user device 104 may include one or more processors 302 and computer-readable media 310 storing computer-executable instructions (e.g., components in the computer-readable media 310) that, when executed by the one or more processors 302, cause the one or more processors to perform operations of the methods/processes.

Figure 6:
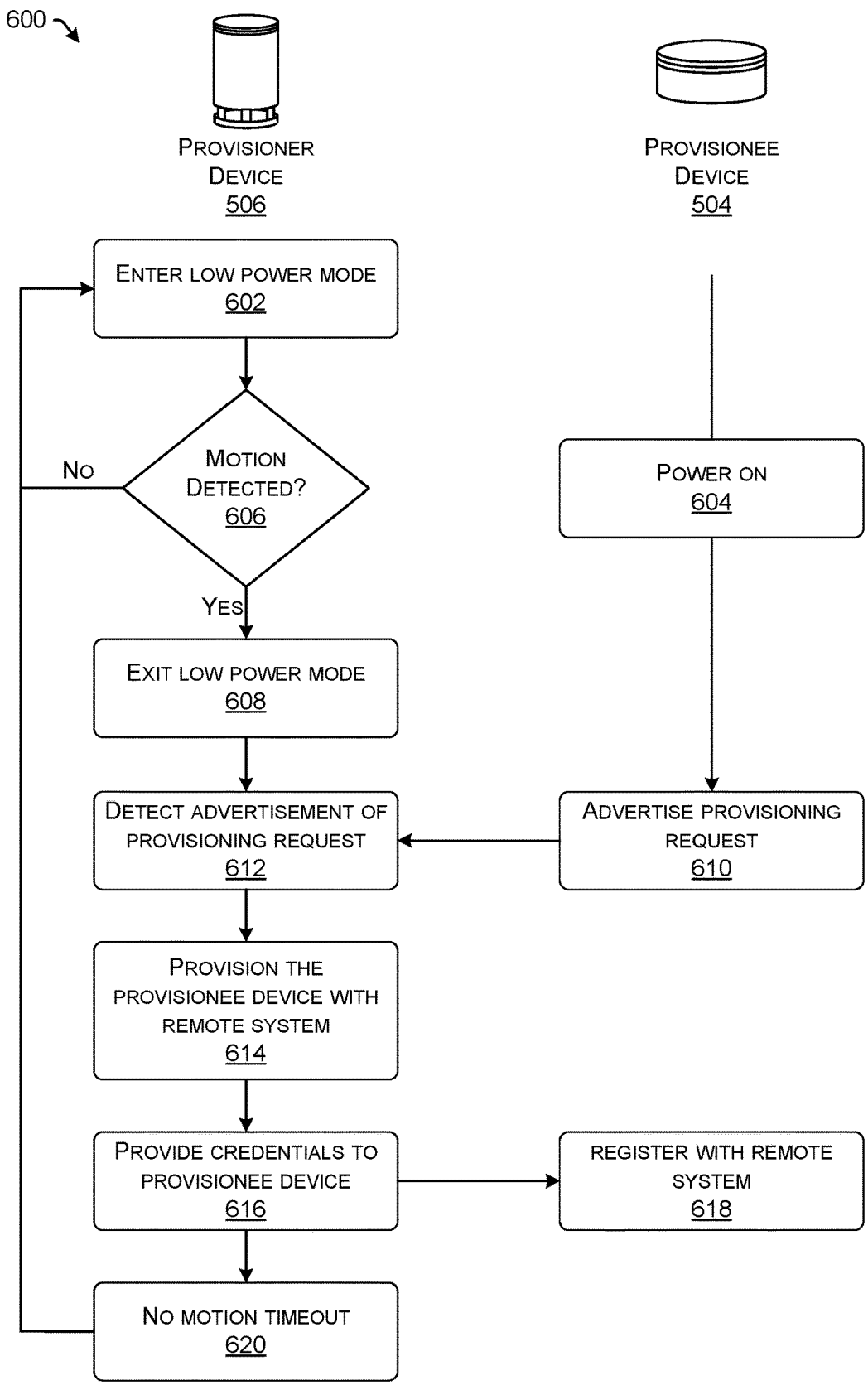
FIG. 6 illustrates a flow diagram of an example method for using presence-detection techniques described herein for a provisioner device to exit a low power mode upon detecting motion through an RF signal of a communication link in order to receive an advertisement message from a provisionee device.

FIG. 6 illustrates a flow diagram of an example method 600 for using presence-detection techniques described herein for a provisioner device 506 to exit a low power mode upon detecting motion through a signal of a communication link 122 in order to receive an advertisement message 512 from a provisionee device 504.

At 602, the provisioner device 506 may enter into a low-power mode. In some instances, this may include powering down at least one radio, such as a Bluetooth and/or ZigBee radio. At 604, the provisionee device 504 may be powered on by a user 502. For instance, a user 502 may have brought a new user device 104 into the environment 502 that needs to be provisioned, and power on the provisionee device 504 to being provisioning the device 504.

At 606, the provisioner device 506 may analyze CSI data 332 for the communication link 122 established with the access point 508. If no motion is detected at 606, the provisioner device 506 may remain in the low power mode. However, if the provisioner device 506 detects motion, the provisioner 506 may exit the low power mode at 608. Generally, exiting the low power mode 608 may include at least powering up a radio to detect an advertisement 512. At 610, the provisionee device 504 may begin emitting, broadcasting, or otherwise advertising a provisioning request in an advertisement 512. At 612, the provisioner device 506 may detect the advertisement 512 of the provisioning request.

At 614, the provisioner device 506 may provision the provisionee device 504 with a remote system 516 (e.g., register the provisionee device 504, obtain credentials for the provisionee device 504, etc.). At 616, the provisioner device 506 may provide credentials to the provisionee device 504. At 618, the provisionee device 504 may register with the remote system 618 using the credentials. At 620, the provisioner device 506 may determine that there has been no motion for longer than a period of time, and move back into the low power mode by at least powering down a radio.

Figure 7:
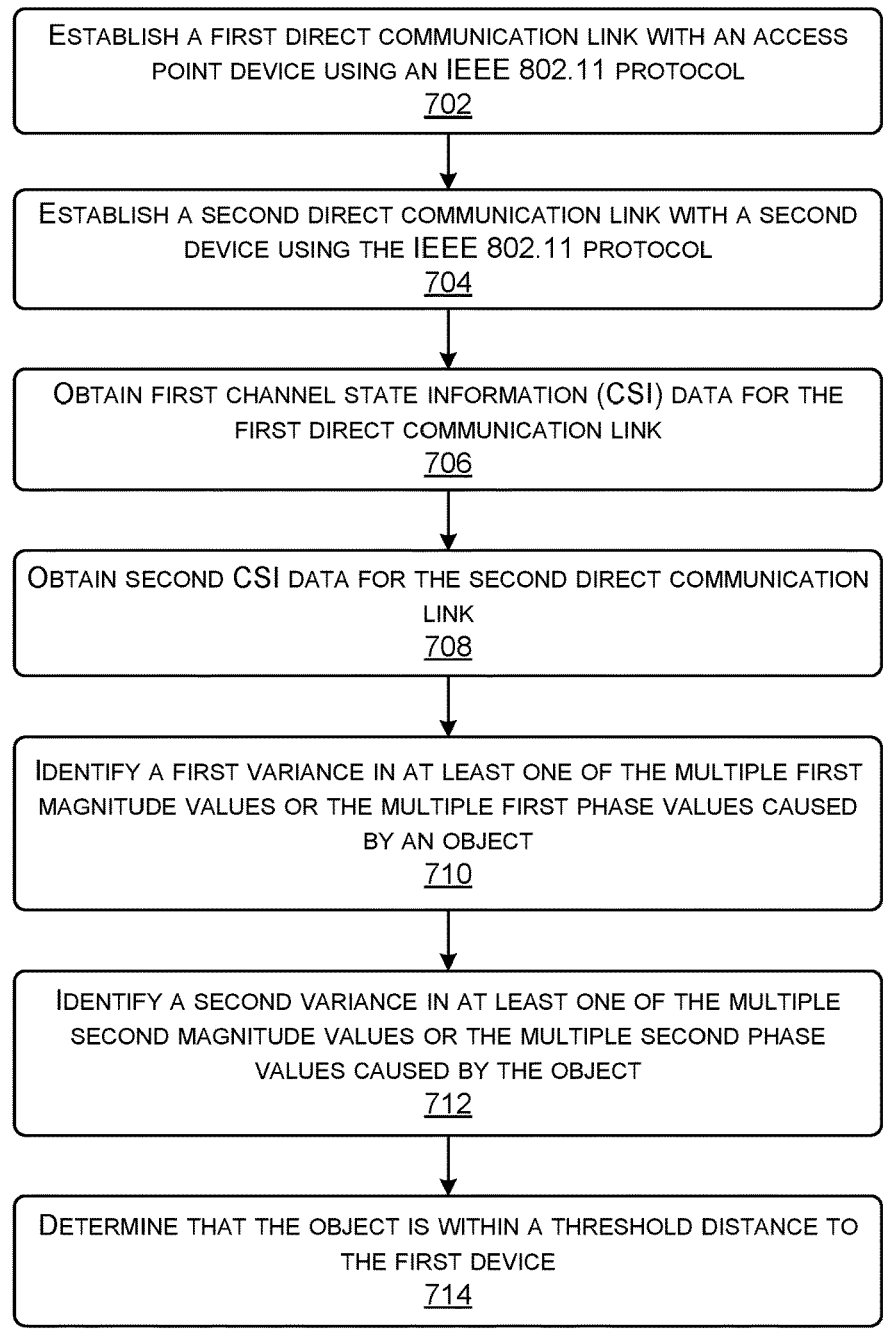
FIG. 7 illustrates a flow diagram of an example method for a user device to perform presence-detection techniques by establishing multiple communication links, monitoring CSI data for the multiple communication links, and determining that a user is within a threshold proximity to the user device based on detecting motion through RF signals of the multiple communication links.

FIG. 7 illustrates a flow diagram of an example method 700 for a user device 104 to perform presence-detection techniques by establishing multiple communication links 122, monitoring CSI data 332 for the multiple communication links 122, and determining that a user 106 is within a threshold proximity to the user device 104 based on detecting motion through the multiple communication links 122.

At 702, a first device 104(1) may establish, with an access point device 118 residing in the environment 100, a first direct communication link using an IEEE 802.11 protocol. In some examples, the access point device providing a wireless local area network (WLAN) using the IEEE 802.11 protocol.

At 704, the first device 104(1) may establish, with a second device 104(2) residing in the environment, a second direct communication link using the IEEE 802.11 protocol, the second direct communication link 122 may comprise a peer-to-peer link, such as a Wi-Fi Direct communication link 122.

At 706, the first device 104(1) may obtain first channel state information (CSI) data for the first direct communication link. The first CSI data may be collected over a period of time, and may be samples or instances of CSI data including a magnitude value and a phase values. In some instances, the first CSI data may include multiple first magnitude values and multiple first phase values collected over the period of time.

At 708, the first device 104(1) may obtain second CSI data for the second direct communication link. The second CSI data may be collected over a period of time, and may be samples or instances of CSI data including a magnitude value and a phase values. In some instances, the second CSI data including multiple second magnitude values and multiple second phase values.

At 710, the first device 104(1) may identify a first variance in at least one of the multiple first magnitude values or the multiple first phase values caused by an object. For instance, the first device 104(1) may determine that CSI data has been sampled over a period of time, and a fluctuation in at least one of a magnitude value and/or a phase value has fluctuated (e.g., increased, decreased, etc.) by more than a threshold amount relative to other magnitude values and/or phase values in the CSI data sampling.

At 712, the first device 104(1) may identify a second variance in at least one of the multiple second magnitude values or the multiple second phase values caused by the object. For instance, the first device 104(1) may determine that CSI data has been sampled over a period of time, and a fluctuation in at least one of a magnitude value and/or a phase value has fluctuated (e.g., increased, decreased, etc.) by more than a threshold amount relative to other magnitude values and/or phase values in the CSI data sampling. In some instances, identifying the first and second fluctuation may be based on the change in values in the CSI data changing by more than a threshold amount indicating the change was caused by movement of an object through signals of the communication links 122.

At 714, the first device 104(1) may, based on the first variance and the second variance, determining that the object is within a threshold distance to the first device. For instance, because the object moved through signals of at least two communication links for the first device 104(1), the first device 104(1) may determine that the object is within a threshold distance to the first device 104(1).

In some examples, method 700 may further comprise determining, based at least in part on the first variance, that the object moved through a first radio frequency (RF) signal over which the first communication link is established, and determining, based at least in part on the second variance, that the object moved through a second RF signal over which the second communication link is established. In such examples, determining that the object is within the threshold distance to the first device is based at least in part on the object moving through the first RF signal and the second RF signal.

Figure 8:
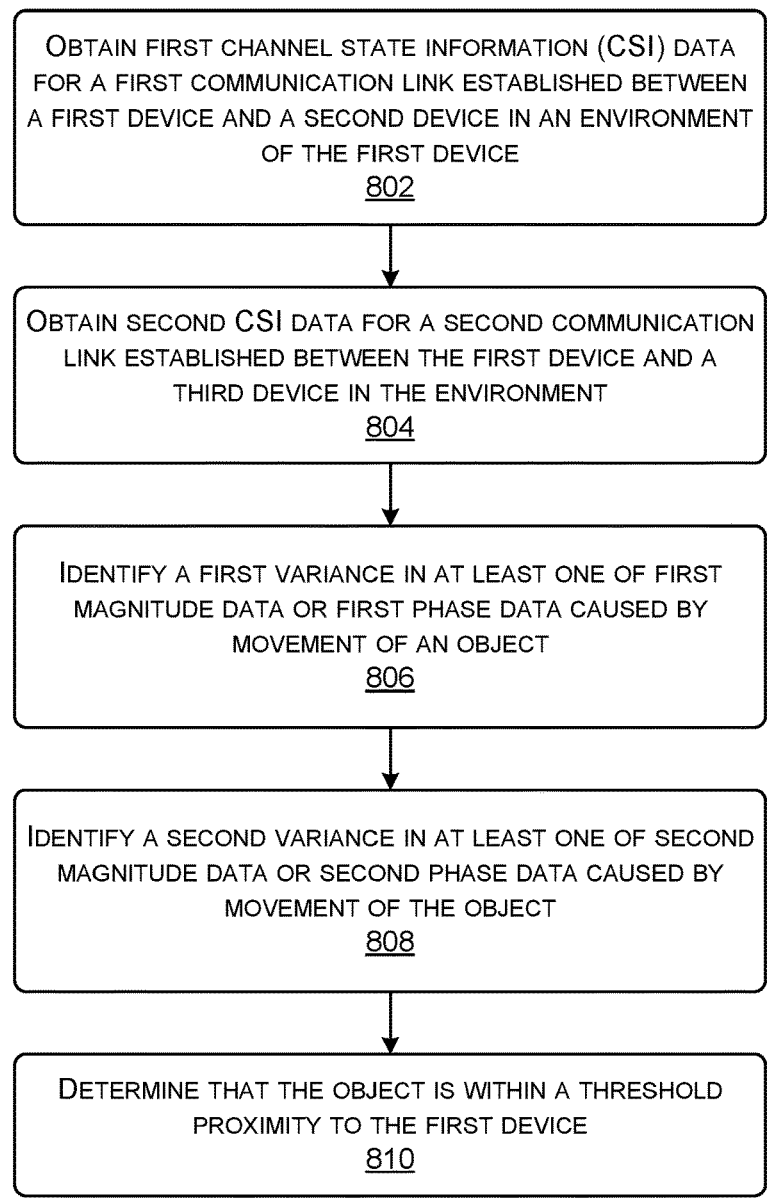
FIG. 8 illustrates a flow diagram of another example method for a user device to perform presence-detection techniques by monitoring multiple communication links, and determining location data for an object based on monitoring the communication links.

FIG. 8 illustrates a flow diagram of another example method 800 for a user device 104 to perform presence-detection techniques by monitoring multiple communication links 122, and determining location data for an object based on monitoring the communication links.

At 802, the first device 104(1) may obtain first channel state information (CSI) data for a first communication link established between the first device and a second device in an environment of the first device. In some instances, the first CSI data may comprise multiple values of CSI data collected (e.g., multiple instances of magnitude and/or phase data collected over a period of time) for the first communication link. For instance, the first CSI data may include first magnitude data and first phase data.

At 804, the first device 104(1) may obtain second CSI data for a second communication link established between the first device and a third device in the environment. For instance, the second CSI data may comprise multiple values of CSI data (e.g., multiple instances of magnitude and/or phase data collected over a period of time) collected for the second communication link. For instance, the second CSI data may include second magnitude data and second phase data.

At 806, the first device 104(1) may identify a first variance in at least one of the first magnitude data or the first phase data caused by movement of an object. For instance, the first device 104(1) may obtain the first CSI data includes obtaining a first magnitude value or a first phase value at a first time and obtaining a second magnitude value or a second phase value at a second time, and identify the first variance by determining a difference between at least one of the first magnitude value and second magnitude value or the first phase value and the second phase value. The method may further include determining that the difference is greater than or equal to a threshold difference indicating movement of the object At 808, the first device 104(1) may identify a second variance in at least one of the second magnitude data or the second phase data caused by movement of the object. At 810, the first device 104(1) may determine that the object is within a threshold proximity to the first device 104(1) based at least in part on the first variance and the second variance.

In some examples, the method may include determining the first proximity data at by determining, by the first user device 104(1) that a first variance in the first CSI data is less than a threshold variance, where the threshold variance representing interference with a signal of a communication link caused by movement of the object (e.g., a threshold amount of fluctuation that indicates motion of an object causing the variance). Further, determining second proximity data may include determining, by the first device 104(1), that the second variance in the second CSI data is less than the threshold variance. Finally, determining third proximity data may include determining, by the first device 104(1), that the object is outside a threshold proximity from the first device based at least in part on the first variance and the second variance being less than the threshold variance.

In other examples, determining the first proximity data includes determining, by the first device 104(1), that a first fluctuation in the first CSI data is greater than or equal to a threshold fluctuation, where the threshold fluctuation representing interference with a communication link caused by movement of the object. Further, determining the second proximity data includes determining, by the first device 104(1), that a second fluctuation in the second CSI data is greater than or equal to the threshold fluctuation. Finally, determining the third proximity data includes determining that the object is within a threshold proximity from the first device based at least in part on the first fluctuation and the second fluctuation being greater than or equal to the threshold fluctuation.

Figure 9:
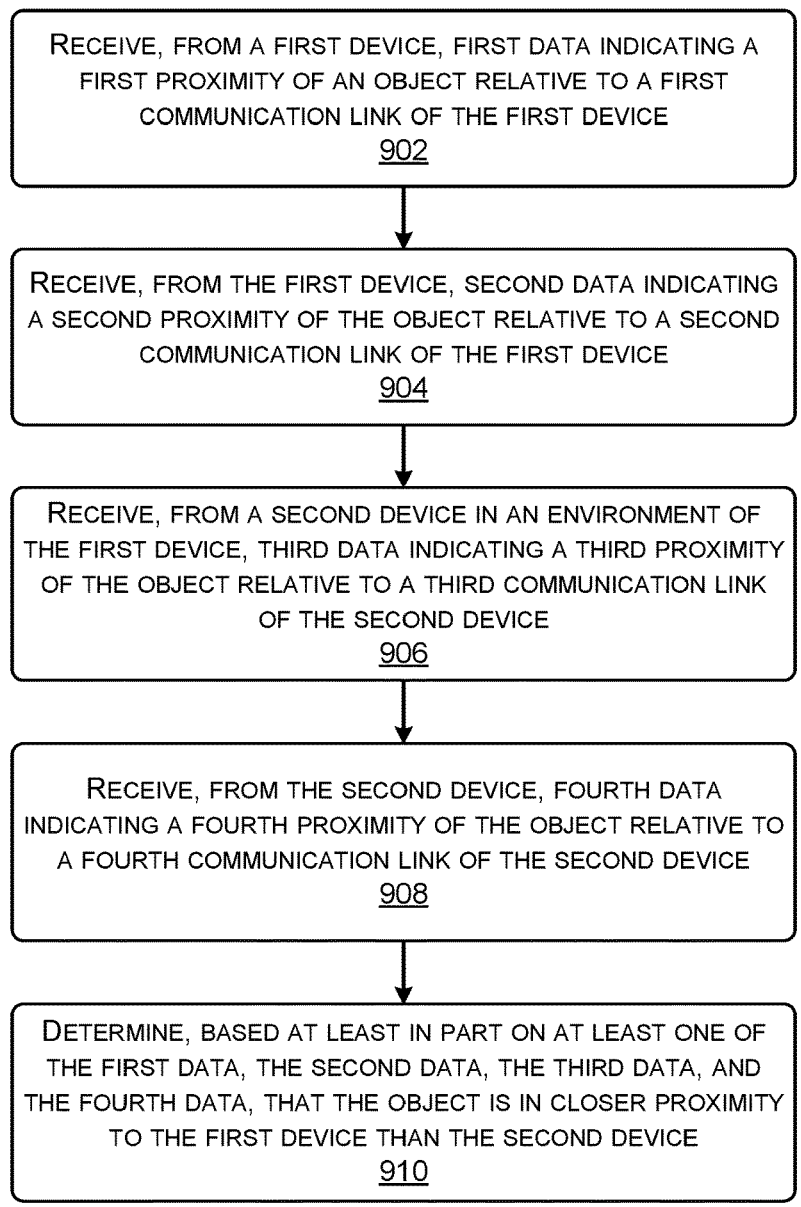
FIG. 9 illustrates a flow diagram of an example method for a coordinating device to receive data from multiple devices indicating likelihoods that an object moved through RF signals of communication links of the multiple devices, and determining that the object is in closer proximity to a first device than a second device.

FIG. 9 illustrates a flow diagram of an example method 900 for a coordinating device 218 to receive communication link data 226 from multiple devices 104 indicating likelihoods that an object moved through communication links 122 of the multiple devices 104, and determining that the object is in closer proximity to a first device 104(1) than a second device 104(2).

At 902, a coordinating device 218 may receive, from a first device 104(1), first data indicating a first proximity of an object relative to a first communication link of the first device. In some instances, the first data may simply comprise an indication as to whether or not an object is moving within a threshold proximity to the first communication link or not. In some instances, the first data may comprise first CSI data for the first communication link.

At 904, the coordinating device 218 may receive, from the first device 104(2), second data indicating a second proximity of the object relative to a second communication link of the first device. In some instances, the second data may simply comprise an indication as to whether or not an object is moving within a threshold proximity to the second communication link or not. In some instances, the second data may comprise second CSI data for the second communication link.

At 906, the coordinating device 218 may receive, from a second device 104(2) in the environment of the first device 104(1), third data indicating a third proximity of the object relative to a third communication link of the second device. In some instances, the third data may simply comprise an indication as to whether or not an object is moving within a threshold proximity to the third communication link or not. In some instances, the third data may comprise third CSI data for the third communication link.

At 908, the coordinating device 218 may receive, from the second device 104(2), fourth data indicating a fourth proximity of the object relative to a fourth communication link of the second device. In some instances, the fourth data may simply comprise an indication as to whether or not an object is moving within a threshold proximity to the fourth communication link or not. In some instances, the fourth data may comprise fourth CSI data for the fourth communication link.

At 910, the coordinating device 218 may determine, based at least in part on at least one of the first data, the second data, the third data, and the fourth data, that the object is in closer proximity to the first device than the second device. For instance, the coordinating device 218 may identify a first fluctuation in the first CSI data indicating that the object moved within a threshold proximity to the first communication link of the first device, and identify a second fluctuation in the second CSI data indicating that the object moved within a threshold proximity to the second communication link of the first device. In such examples, determining that the object is in closer proximity to the first device than the second device is based at least in part on the object moving within the threshold proximity to the first communication link and the second communication link.

In some instances, the coordinating device 218 may determine that the object is in closer proximity to the first device than the second device by determining, based at least in part on the first data, that the object moved within a threshold proximity to the first communication link, determining, based at least in part on the second data, that the object moved within the threshold proximity to second communication link, and determining that the third data indicates that the object did not move within the threshold proximity to third communication link.

Figure 10:
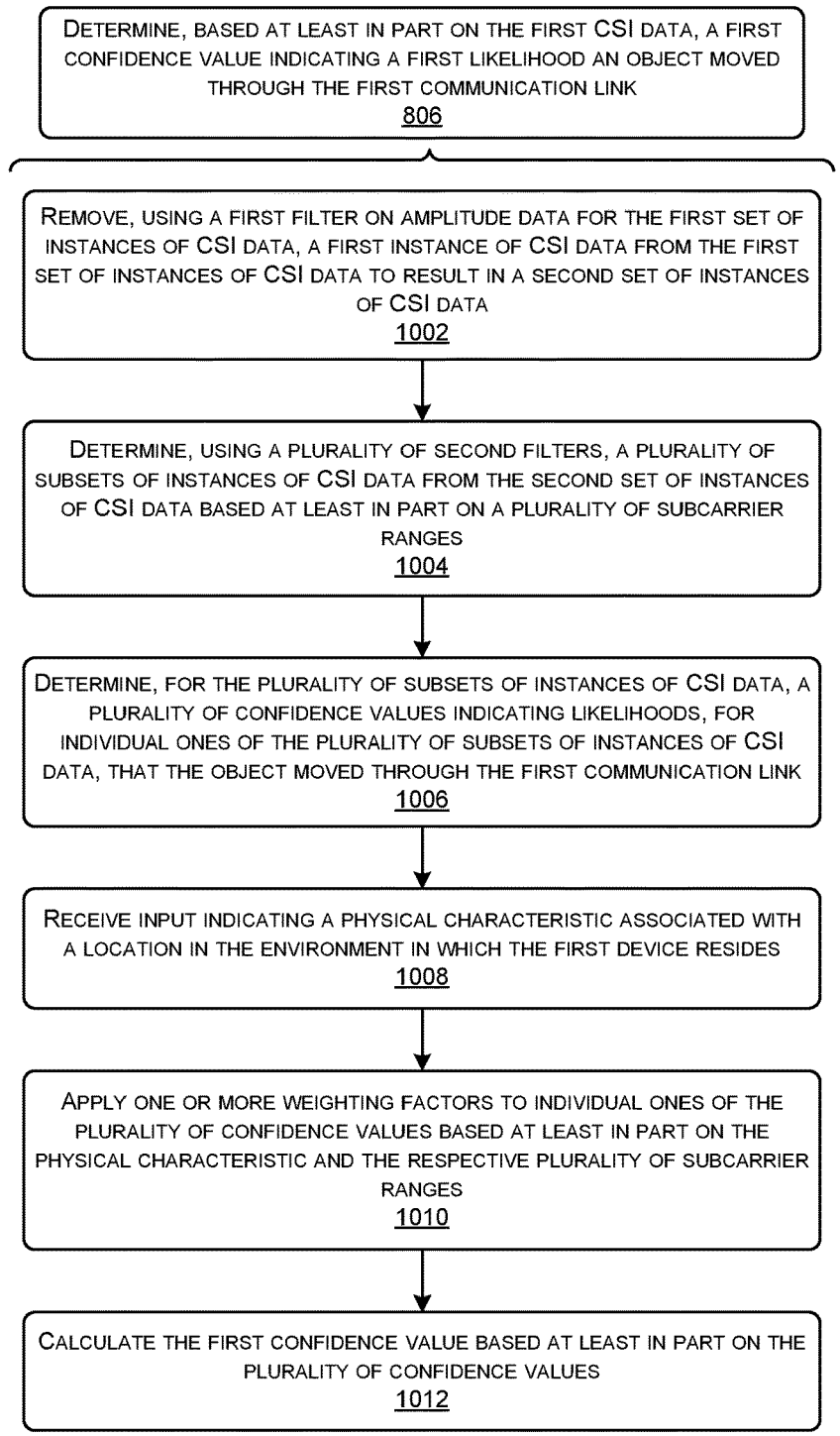
FIG. 10 illustrates a flow diagram of an example method for a user device to implement a cascading filtering architecture to process CSI data for a communication link to detect motion through an RF signal of the communication link.

FIG. 10 illustrates a flow diagram of an example method 1000 for a user device 104 to implement a cascading filtering architecture to process CSI data for a communication link to detect motion through the RF signal of the communication link. In some instances, the method 1000 may be performed by the user device 104 determine a first confidence value based on first CSI data, where the first confidence value indicates a first likelihood that an object moved through the first communication link. In some instances, the first CSI data is a first set of instances of CSI data obtained over a period of time for the first communication link.

At 1002, the first device 104 may remove, using a first filter on amplitude data for the first set of instances of CSI data, a first instance of CSI data from the first set of instances of CSI data to result in a second set of instances of CSI data. At 1004, the first device 104 may determine, using a plurality of second filters, a plurality of subsets of instances of CSI data from the second set of instances of CSI data based at least in part on a plurality of subcarrier ranges. At 1006, the first device 104 may determine, for the plurality of subsets of instances of CSI data, a plurality of confidence values indicating likelihoods, for individual ones of the plurality of subsets of instances of CSI data, that the object moved through the first communication link. At 1008, the first device 104 may receive input indicating a physical characteristic associated with a location in the environment in which the first device resides. At 1010, the first device 104 may apply one or more weighting factors to individual ones of the plurality of confidence values based at least in part on the physical characteristic and the respective plurality of subcarrier ranges. At 1010, the first device 104 may calculate the first confidence value based at least in part on the plurality of confidence values.

As used herein, a processor, such as processor(s) 302, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 302 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 302 may possess its own local memory, which also may store program components, program data, and/or one or more operating systems.

As described herein, computer-readable media 310 may include volatile and nonvolatile memory, removable and non-removable media implemented in any method or technology for storage of information, such as computer-readable instructions, data structures, program component, or other data. Such computer-readable media 310 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 302 to execute instructions stored on the computer-readable media 310. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 310, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a first device, the method comprising:
   establishing a communication link with a second device residing in an environment of the first device;
   causing a radio of the first device to enter a first mode during which the radio of the first device draws a first amount of power;
   obtaining channel state information (CSI) data associated with the communication link;
   identifying a variance in the CSI data;
   causing the radio to enter a second power mode during which the radio draws a second amount of power, the second amount of power being greater than the first amount of power;
   receiving, using the radio, data including a provisioning request from a third device in the environment, the third device lacking network credentials for connecting to a network to which the first device is connected;
   obtaining, from a remote system, the network credentials; and
   sending the network credentials to the third device.

2. The method of claim 1, further comprising:
   determining that the variance indicates movement of an object in the environment,
   wherein causing the radio to enter the second power mode is performed at least partly in response to the movement of the object.

3. The method of claim 1, wherein:
   obtaining the CSI data includes obtaining a first magnitude value or a first phase value at a first time and obtaining a second magnitude value or a second phase value at a second time;
   identifying the variance includes determining a difference between at least one of the first magnitude value and second magnitude value or the first phase value and the second phase value; and determining that the variance indicates movement includes determining that the difference is greater than or equal to a threshold difference.

4. The method of claim 1, wherein:
establishing the communication link comprises using an IEEE 802.11 protocol, the second device comprising an access point device providing a wireless local area network (WLAN) in the environment; and
the data is received using a Bluetooth protocol.

5. The method of claim 1, further comprising:
determining that motion has not been detected in the environment for a threshold period of time; and
causing the radio to enter the first mode.

6. The method of claim 1, wherein identifying the variance includes detecting a change in a characteristic of a radio frequency (RF) signal over which the communication link is established, the change indicating that an object moved through the RF signal.

7. The method of claim 1, wherein:
the radio is a first radio;
causing the first radio to enter the first mode includes powering off a function of the first radio such that the first radio is unable to detect the data; and
establishing the communication link and obtaining the CSI data are performed using a second radio.

8. A first device comprising:
a radio;
one or more processors; and
one or more computer-readable media storing computer-executable instructions that, when executed by the one or more processors, cause the one or more processors to perform operations comprising:
establishing a communication link with a second device residing in an environment of the first device;
causing the radio to enter a first mode during which the radio is unable to detect communications;
obtaining channel state information (CSI) data associated with the communication link;
identifying a variance in the CSI data;
causing the radio to enter a second power mode during which the radio is able to detect communications;
receiving, using the radio, data including a provisioning request from a third device in the environment, the third device lacking network credentials for connecting to a network to which the first device is connected;
obtaining the network credentials; and
sending the network credentials to the third device.

9. The first device of claim 8, the operations further comprising:
determining that the variance indicates movement of an object in the environment,
wherein causing the radio to enter the second power mode is performed at least partly in response to the movement of the object.

10. The first device of claim 8, wherein:
obtaining the CSI data includes obtaining a first magnitude value or a first phase value at a first time and obtaining a second magnitude value or a second phase value at a second time;
identifying the variance includes determining a difference between at least one of the first magnitude value and second magnitude value or the first phase value and the second phase value; and
determining that the variance indicates movement includes determining that the difference is greater than or equal to a threshold difference.

11. The first device of claim 8, wherein:
establishing the communication link comprises using an IEEE 802.11 protocol, the second device comprising an access point device providing a wireless local area network (WLAN) in the environment; and
the data is received using a Bluetooth protocol.

12. The first device of claim 8, the operations further comprising:
determining that motion has not been detected in the environment for a threshold period of time; and
causing the radio to enter the first mode.

13. The first device of claim 8, wherein identifying the variance includes detecting a change in a characteristic of a radio frequency (RF) signal over which the communication link is established, the change indicating that an object moved through the RF signal.

14. The first device of claim 8, wherein:
the radio is a first radio;
causing the first radio to enter the first mode includes powering off a function of the first radio such that the first radio is unable to detect the data; and
establishing the communication link and obtaining the CSI data are performed using a second radio.

15. A system comprising:
a radio;
one or more processors; and
one or more computer-readable media storing computer-executable instructions that, when executed by the one or more processors, cause the one or more processors to perform operations comprising:
establishing a communication link with a second device residing in an environment associated with the system;
causing the radio to enter a first mode during which the radio is unable to detect communications;
obtaining channel state information (CSI) data associated with the communication link;
identifying a variance in the CSI data;
causing the radio to enter a second power mode during which the radio is able to detect communications;
receiving, using the radio, data including a provisioning request from a third device in the environment, the third device lacking network credentials for connecting to a network to which the system is connected;
obtaining the network credentials on behalf of the third device; and
sending the network credentials to the third device.

16. The system of claim 15, the operations further comprising:
determining that the variance indicates movement of an object in the environment,
wherein causing the radio to enter the second power mode is performed at least partly in response to the movement of the object.

17. The system of claim 15, wherein:
obtaining the CSI data includes obtaining a first magnitude value or a first phase value at a first time and obtaining a second magnitude value or a second phase value at a second time;
identifying the variance includes determining a difference between at least one of the first magnitude value and second magnitude value or the first phase value and the second phase value; and
determining that the variance indicates movement includes determining that the difference is greater than or equal to a threshold difference.

18. The system of claim 15, wherein:
- establishing the communication link comprises using an IEEE 802.11 protocol, the second device comprising an access point device providing a wireless local area network (WLAN) in the environment; and
- the data is received using a Bluetooth protocol.

19. The system of claim 15, the operations further comprising:
- determining that motion has not been detected in the environment for a threshold period of time; and
- causing the radio to enter the first mode.

20. The system of claim 15, wherein identifying the variance includes detecting a change in a characteristic of a radio frequency (RF) signal over which the communication link is established, the change indicating that an object moved through the RF signal.

* * * * *